(12) United States Patent
Iwase et al.

(10) Patent No.: US 6,277,511 B1
(45) Date of Patent: Aug. 21, 2001

(54) FUEL CELL

(75) Inventors: Masayoshi Iwase, Anjo; Hitoshi Hamada, Susono, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/270,359

(22) Filed: Mar. 16, 1999

(30) Foreign Application Priority Data

Jul. 8, 1998 (JP) .................................................. 10-192833

(51) Int. Cl.⁷ ...................................................... H01M 8/04
(52) U.S. Cl. .................................................. 429/32; 429/34
(58) Field of Search ................. 429/22, 34, 38, 429/39

(56) References Cited

U.S. PATENT DOCUMENTS

| | | | |
|---|---|---|---|
| 3,553,023 | * | 1/1971 | Doyle ...................................... 429/22 |
| 4,243,731 | * | 1/1981 | Cherón ............................. 429/34 X |
| 4,397,918 | | 8/1983 | Chi . |
| 4,582,765 | * | 4/1986 | Kothmann ......................... 429/34 X |
| 5,348,814 | * | 9/1994 | Niikura et al. ..................... 429/34 X |

FOREIGN PATENT DOCUMENTS

| | | |
|---|---|---|
| 0 589 850 | 3/1994 | (EP) . |
| 61-027071 | 2/1986 | (JP) . |
| 61-49382 | 3/1986 | (JP) . |
| 62-76260 | 4/1987 | (JP) . |
| 2-226669 | 9/1990 | (JP) . |
| 8-31442 | 2/1996 | (JP) . |
| 8-45526 | 2/1996 | (JP) . |
| 09-312168 | 12/1997 | (JP) . |
| 11-067260 | 3/1999 | (JP) . |
| WO 85/01072 | 3/1985 | (WO) . |

* cited by examiner

Primary Examiner—Stephen Kalafut
(74) Attorney, Agent, or Firm—Kenyon & Kenyon

(57) ABSTRACT

A fuel cell has a plurality of passages for conveying a fluid in a stack formed of a plurality of unit cells. The connection of the passages is changed in accordance with the operating condition of the fuel cell. If the passage connection is thus changed, the passage resistance in the stack changes, so that an optimal performance of the fuel cell can be achieved in accordance with the operating condition thereof.

8 Claims, 11 Drawing Sheets

FUEL CELL

INCORPORATION BY REFERENCE

The disclosure of Japanese Patent Application No. HEI 10-192833 filed on Jul. 8, 1998 including the specification, drawings and abstract is incorporated herein by reference in its entirety.

BACKGROUND OF THE INVENTION

1. Field of the Invention

The present invention relates to a fuel cell formed by stacking a plurality of unit cells.

2. Description of the Related Art

Fuel cells are known as devices for converting energy of a fuel into electric energy. A typical fuel cell has a stack structure formed by stacking a plurality of unit cells. Normally, each cell has a pair of electrodes that are disposed so as to sandwich an electrolyte member. An electrochemical reaction occurs when a hydrogen-containing reaction gas (fuel gas) contacts a surface of one of the pair of electrodes in each cell and an oxygen-containing gas (air) contacts a surface of the other electrode. By utilizing this electrochemical reaction, each fuel cell generates electric energy.

Japanese Patent Application Laid-open No. HEI 2-226669 discloses a fuel cell system having a plurality of fuel cell stacks divided into a plurality of blocks, with the flow rates of the gasses supplied to the fuel cells in each block being controlled.

This fuel cell system uses flow rate regulating valves to control the gas flow rates to the individual blocks. Therefore, a great number of flow rate regulating valves are required, so that the cost of the fuel cell system increases.

Furthermore, the aforementioned fuel cell system has stacks that are formed by stacking a plurality of cells, and generates electric energy by utilizing the chemical reaction occurring in each cell. Therefore, in order to optimize the power generating efficiency of the fuel cell system, it is preferable to optimize the power generating efficiency (reaction efficiency) in each fuel cell stack. However, the aforementioned system does not allow control to be performed in accordance with a parameter other than the gas flow rates to the individual fuel cell stacks, so that it is difficult to optimize the power generating efficiency in the fuel cell system.

SUMMARY OF THE INVENTION

Accordingly, it is an object of the present invention to provide a fuel cell capable of achieving an optimal performance in accordance with an operating condition of the fuel cell.

According to the invention, there is provided a fuel cell including a stack formed of a plurality of cells, a plurality of first passages for a first fluid that flows in the stack, and a passage changer that changes a connection state of the first passages in accordance with an operating condition of the fuel cell.

Therefore, this fuel cell makes it possible to change the connection state of the passages in the stack provided in the fuel cell in accordance with the operating condition of the fuel cell, so as to change the fluid flow velocity distribution and the fluid passage sequence in accordance with the operating condition. That is, it becomes possible to control the fluid flow rate required in the stack. As a result, an optimal performance of the fuel cell can be achieved.

According to the invention, the passage changer may change the connection state of the first passages so that a passage resistance of the first passages changes. For example, if the fluid that flows in the stack is a reaction gas, the connection state of the passages may be changed so that the passage resistance decreases as the output of the fuel cell increases. As a result, a gas flow rate required for high output operation can reliably be attained, so that favorable progress of reactions in the fuel cell can be maintained.

If the fluid that flows in the stack is a coolant, for example, cooling water or the like, the connection state of the passages may be changed so that the flow velocity increases as the output of the fuel cell increases. An increased flow velocity causes turbulence of the coolant, so that the cooling performance during high output operation can be enhanced.

If in addition to the first passages for the first fluid that flows in the stack, a plurality of second passages for a second fluid that flows in the stack are provided. The connection state of the second passages may be changed synchronously with a timing of changing the connection state of the first passages. For example, by changing the connection state of a plurality of cooling water passages synchronously with the changing of the connection state of a plurality of gas passages, cooling can be performed in accordance with the gas flow rate.

Furthermore, the fuel cell of the invention may also have a construction as follows. That is, an upstream-side portion of each of the first passages located at an inlet side is formed on a dry-type electrolyte membrane, and a downstream-side portion of each first passage located at an outlet side is formed on a wet-type electrolyte membrane. This construction will further optimize the chemical reactions in the fuel cell.

The plurality of cells may be divided into a first group and a second group. In this case, the number of passages divided in each cell of the first group may be different from the number of passages divided in each cell of the second group. This construction increases the variations of passages and therefore increases the freedom in design and the like, in comparison with a construction in which all the cells of a stack have the same number of divided passages.

If a passage in the stack is divided into a plurality of passages in a cell, inlets and outlets of the divided passages may be formed near a predetermined side of the cell. This arrangement makes it possible to reduce dead spaces related to portions required for gas manifolds or sealing. Therefore, the output density per unit volume of the fuel cell can be increased.

BRIEF DESCRIPTION OF THE DRAWINGS

The foregoing and further objects, features and advantages of the present invention will become apparent from the following description of preferred embodiments with reference to the accompanying drawings, wherein like numerals are used to represent like elements and wherein.

DETAILED DESCRIPTION OF PREFERRED EMBODIMENTS

Preferred embodiments of the present invention will be described in detail hereinafter with reference to the accompanying drawings.

A first embodiment of the fuel cell of the invention will be described with reference to FIGS. 1A through 5C. A fuel cell 1 of this embodiment includes a stack 12 formed by stacking a plurality of unit cells (hereinafter, simply referred to as "cells") 10.

Figure 1A:
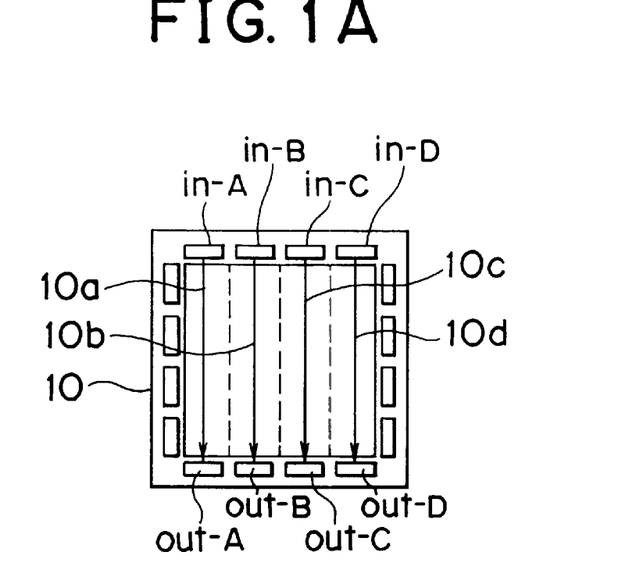
FIG. 1A is a schematic illustration of a construction of each cell incorporated in a fuel cell according to a first embodiment of the invention.

FIG. 1A shows the construction of a cell 10, that is, a component unit of the stack 12 provided in the fuel cell 1. The stack 12 is composed of ten cells 10, all of which have a construction as shown in FIG. 1A.

As shown in FIG. 1A, a gas passage is divided into four passage 10a–10d in each cell 10 according to this embodiment. The four passage 10a–10d extend substantially parallel in a plane of each cell 10. The passage 10a–10d have inlets that are open to inlet passages in-A, in-B, in-C, in-D, respectively, and outlets that are open to outlet passages out-A, out-B, out-C, out-D, respectively. The passages 10a–10d are separated from one another, and designed to convey a gas (for example, a reaction gas containing hydrogen).

In this embodiment, the gas passages are selectively changed in accordance with the output level of the fuel cell 1.

Figure 1B:
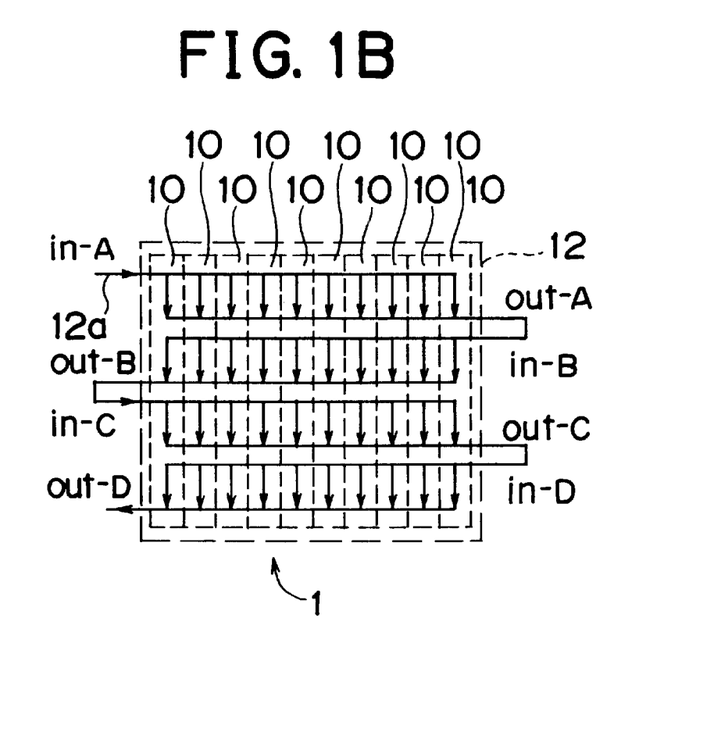
FIGS. 1B through 1D are schematic illustrations of gas passages in the stack in accordance with the levels of output of the fuel cell.

FIG. 1B is a schematic illustration of a gas passage 12a in the stack 12 when the output of the fuel cell 1 is at a low level.

The gas is introduced into the stack 12 via the inlet passage in-A, and flows through the passage 12a, and flows out from the stack 12 via the outlet passage out-D.

Figure 2:
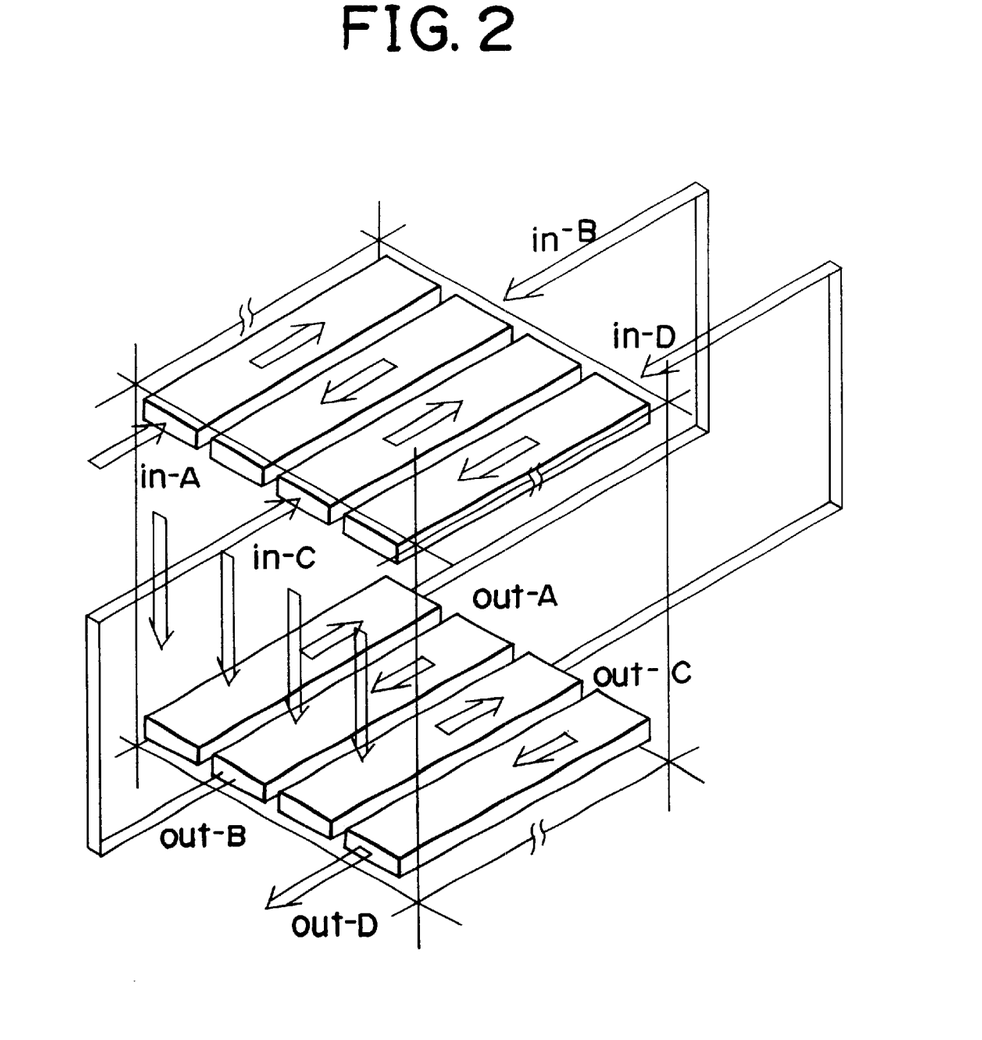
FIG. 2 is a perspective illustration of a gas passage in the stack.

The gas passage will be further described in detail with reference to FIG. 2, in which the gas passage is indicated by arrows. After being introduced from the inlet passage in-A into the ten cells 10 in parallel, the gas flows out from the cells 10 into the outlet passage out-A. The gas is then introduced from the outlet passage out-A into the inlet passage in-B. Subsequently, the gas flows from the inlet passage in-B into the cells 10 in parallel, and flows out into the outlet passage out-B. The gas is then introduced into the inlet passage in-C. Likewise, the gas flows from the inlet passage in-C into the cells 10 in parallel, and flows out into the outlet passage out-C. The gas is then introduced into the inlet passage in-D, and flows from the inlet passage in-D into the cells 10 in parallel, and flows out from the stack 12 via the outlet passage out-D.

That is, the passage 12a is formed so that the gas flows through the passages in each cell 10 in the order of the passage 10a, the passage 10b, the passage 10c and the passage 10d.

Figure 1C:
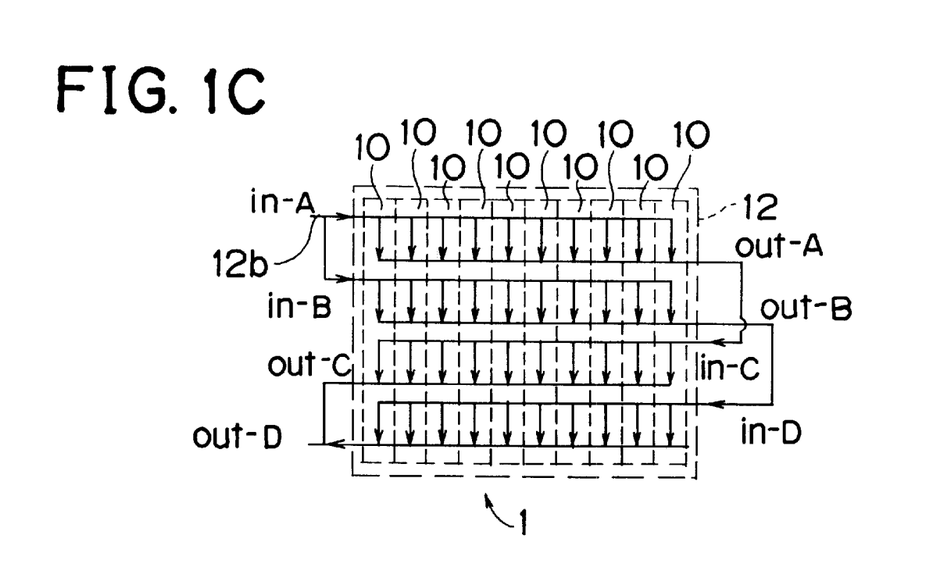

FIG. 1C is a schematic illustration of a gas passage 12b in the stack 12 when the output of the fuel cell 1 is at an intermediate level.

The gas is introduced into the stack 12 via the inlet passages in-A, in-B, and flows through the passage 12b, and flows out of the stack 12 via the outlet passages out-C, out-D.

More specifically, the gas from the inlet passage in-A is introduced into the ten cells 10 in parallel, and flows out into the outlet passage out-A. The gas is then introduced into the inlet passage in-C. Subsequently, the gas flows from the inlet passage in-C into the ten cells 10 in parallel, and then flows out from the stack 12 via the outlet passage out-C. The gas from the inlet passage in-B is introduced into the ten cells 10 in parallel, and flows out into the outlet passage out-B. The gas is then introduced into the inlet passage in-D. Subsequently, the gas flows from the inlet passage in-D into the cells 10 in parallel, and flows out from the stack 12 via the outlet passage out-D.

That is, the passage 12b is formed so that the gas is introduced into each cell 10 via the inlet passages in-A, in-B in parallel, and flows out from each cell 10 via the outlet passages out-C, out-D. In each cell, the gas from the inlet passage in-A flows through the passage 10a and the passage 10c in that order, and the gas from the inlet passage in-B flows through the passage 10b and the passage 10d in that order.

Figure 1D:
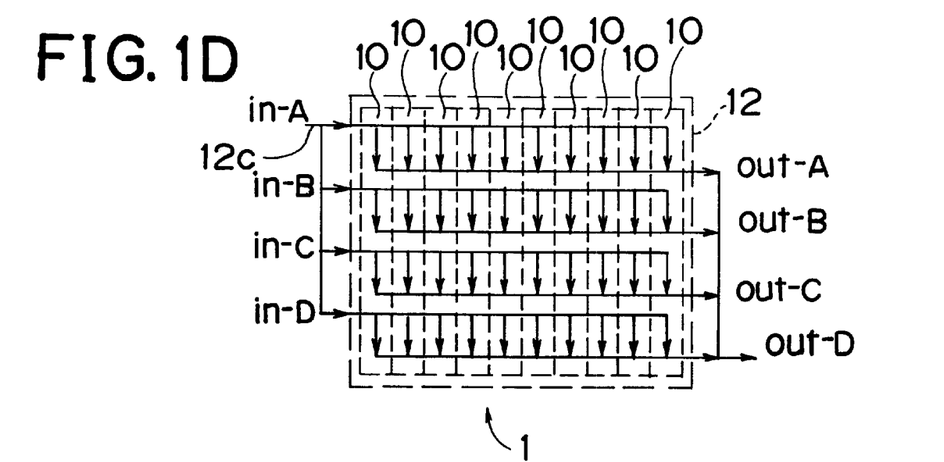

FIG. 1D is a schematic illustration of a gas passage 12c in the stack 12 when the output of the fuel cell 1 is at a high level.

In this case, the gas is introduced into the stack 12 via the four inlet passages in-A, in-b, in-C, in-D in parallel. After being introduced into the stack 12, the gas flows through the passage 12c, and flows out of the stack 12 via the four outlet passages out-A, out-B, out-C, out-D.

That is, the passage 12c is formed so that the gas is introduced via the inlet passages in-A through in-D in parallel, and flows out via the outlet passage out-A through out-D.

The stack 12 is thus provided with the three gas passages 12a, 12b, 12c, via each of which the gas flows through the cells 10. One of the three passages 12a–12c is selected by changing the connection of a plurality of passages in the stack 12 in accordance with the operating condition of the fuel cell 1. Therefore, the flow velocity distribution in the stack 12 and the gas passage sequence or order can be changed, so that an optimal cell performance can be achieved in accordance with the operating condition of the fuel cell 1.

Preferably, the connection of the passages is changed so that the passage sectional area in the stack 12 increases as the output level of the fuel cell 1 becomes higher (that is, as the gas flow rate in the stack 12 becomes higher). This means that the connection of the passages should preferably be changed so that the passage resistance decreases as the output level of the fuel cell 1 becomes higher. By changing the passage connection in this manner, the pressure loss in the passage can be reduced, so that a gas flow rate required for a high output can be reliably achieved. Therefore, the system efficiency improves. Furthermore, since this embodiment allows the gas flow velocity to be optimized in accordance with the output level of the fuel cell 1, the output of the fuel cell 1 becomes stable over a wide output range.

The connection of the passages formed in the stack 12 can be changed by, for example, controlling the open and closed states of a plurality of electromagnetic valves.

Figure 3:
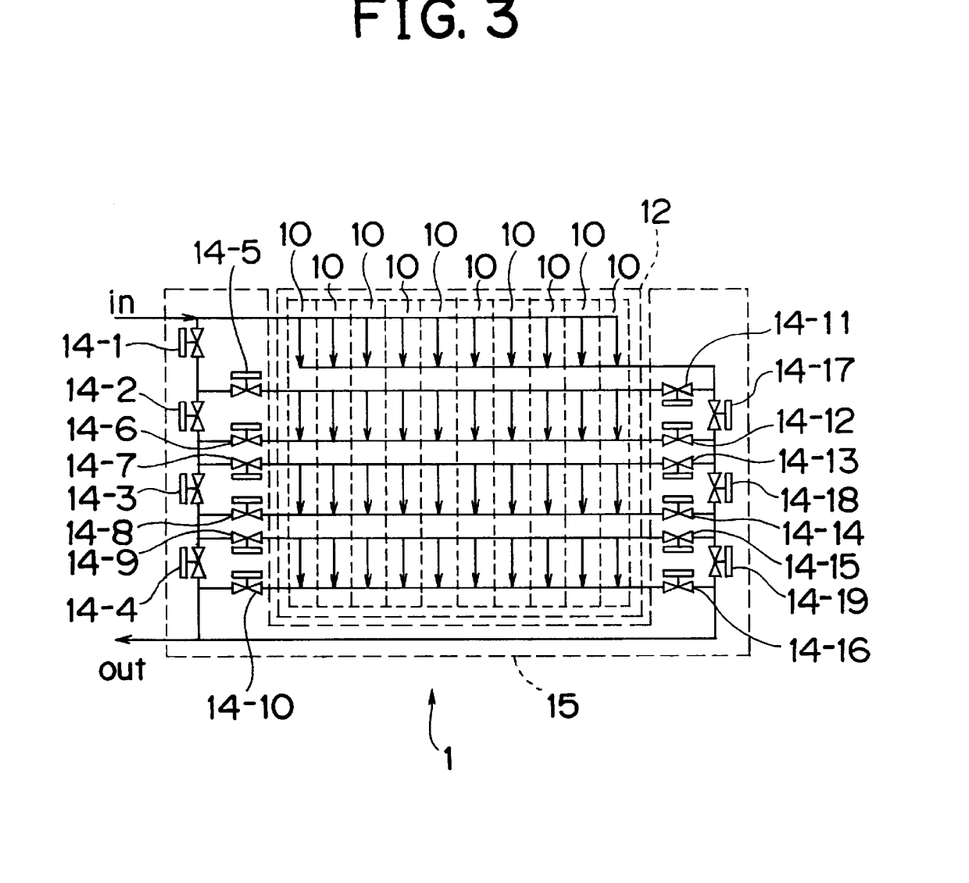
FIG. 3 illustrates a construction of a passage changing device.

FIG. 3 illustrates the construction of a passage changing device 15 including valves 14-1 through 14-19 for changing among the passages 12a, 12b, 12c in the stack 12.

Table 1 shows the open or closed state of each of the valves 14-1 through 14-10 corresponding to the high, intermediate and low output levels of the fuel cell 1. By controlling the states of the valves 14-1 through 14-10 as shown in Table 1, a suitable one of the passages 12a, 12b, 12c in the stack 12 can be selected.

TABLE 1

| Valve No. | Low output level (passage 12a) | Intermediate output level (passage 12b) | High output level (passage 12c) |
| --- | --- | --- | --- |
| 14-1 | Closed | Open | Open |
| 14-2 | Closed | Closed | Open |
| 14-3 | Closed | Closed | Open |
| 14-4 | Closed | Open | Closed |
| 14-5 | Closed | Open | Open |
| 14-6 | Open | Closed | Closed |
| 14-7 | Open | Closed | Open |
| 14-8 | Closed | Open | Closed |
| 14-9 | Closed | Closed | Open |
| 14-10 | Open | Open | Closed |
| 14-11 | Open | Closed | Closed |
| 14-12 | Closed | Open | Open |
| 14-13 | Closed | Open | Closed |
| 14-14 | Open | Closed | Open |
| 14-15 | Open | Open | Closed |
| 14-16 | Closed | Closed | Open |
| 14-17 | Closed | Open | Open |
| 14-18 | Closed | Open | Open |
| 14-19 | Closed | Closed | Open |

Although the passage is divided into four passages in each cell 10, the number of divided passages in each cell 10 is not limited to four. The number of divided passages in each cell 10 needs to be two or more in this embodiment, and the number is preferably 3 to 6.

It is preferable that a dry-type electrolyte membrane that needs no (or little) moisturizing be formed on a surface of each cell 10 on which the passages 10a–10d are formed. Such a dry-type electrolyte membrane may be, for example, a fluorine-based membrane. However, if a fluorine-based membrane is formed so as to extend over the entire area of the passages 10a–10d, the cost of each cell 10 may become undesirably high.

Therefore, it is preferred to form the passages 10a, 10b of each cell 10, that is, upstream-stage passages which function as upstream passages relative to the other passages 10c, 10d if the output of the fuel cell 1 is at the low or intermediate level (see FIGS. 1B and 1C), on a fluorine-based membrane, and to form the downstream-stage passages 10c, 10d on a hydrocarbon-based membrane. This design reduces the cost of cells 10 because hydrocarbon-based membranes normally cost less than fluorine-based membranes.

Hydrocarbon-based membranes are wet-type electrolyte membranes that need moisturizing. Therefore, if a dry cathode operation, that is, an operation without moisturizing the cathodes, is performed where a hydrocarbon-based membrane is used, there normally is a danger that the operation becomes impossible due to moisture shortage. However, in the case where the hydrocarbon-based membrane is used only for the downstream-stage passages in each cell 10, moisture shortage that prevents the cell operation does not occur because water or moisture is supplied to the downstream-stage passages by the chemical reaction on the cathodes. It is more preferable to use the hydrocarbon membrane only for a downstream-side portion of each of the passages 10c, 10d, considering the case illustrated in FIG. 1D where the output of the fuel cell 1 is at a high level.

Figure 4:
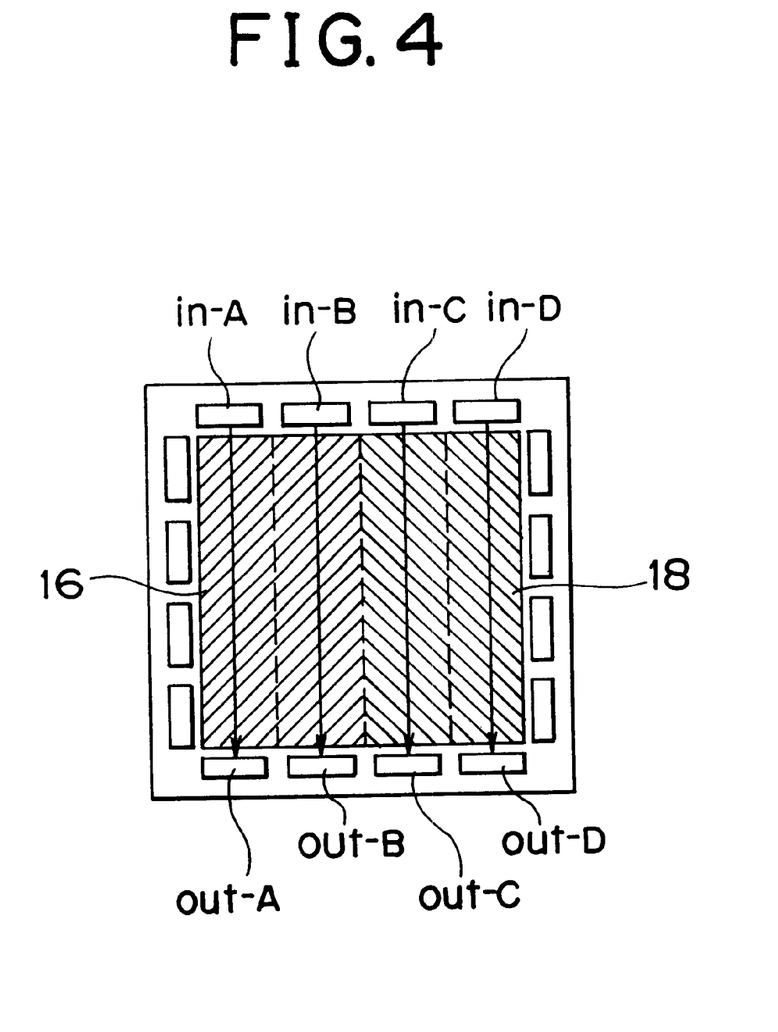
FIG. 4 illustrates an arrangement of a fluorine-based membrane and a hydrocarbon-based membrane in each cell.

FIG. 4 illustrates an arrangement of a fluorine-based membrane 16 and a hydrocarbon-based membrane 18 in each cell 10. In FIG. 4, the fluorine-based membrane 16 is indicated by a hatching from upper right to lower left, and the hydrocarbon-based membrane 18 is indicated by a hatching from upper left to lower right.

By arranging the fluorine-based membrane 16 (dry-type electrolyte membrane) and the hydrocarbon-based membrane 18 (wet-type electrolyte membrane) as illustrated in FIG. 4, operation failure due to moisture shortage is prevented, so that the cost of the cells 10 can be reduced.

Figure 5A:
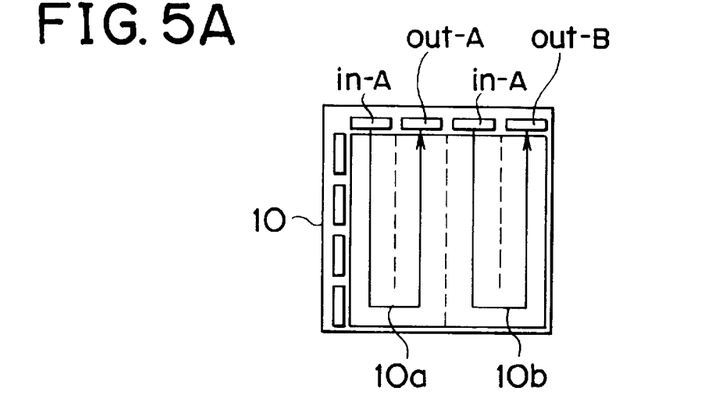
FIG. 5A illustrates a construction of each cell of the fuel cell.

FIG. 5A illustrates a modified construction of a cell 10. In the cell 10 shown in FIG. 5A, inlets in-A, in-B and outlets out-A, out-B of gas passages 10a, 10b are arranged near a predetermined side of the four sides of the cell 10. By adopting this arrangement, it becomes possible to reduce the dead spaces related to portions required for the gas manifolds and the sealing. As a result, the output density per unit volume of the fuel cell 1 increases.

Figure 5B:
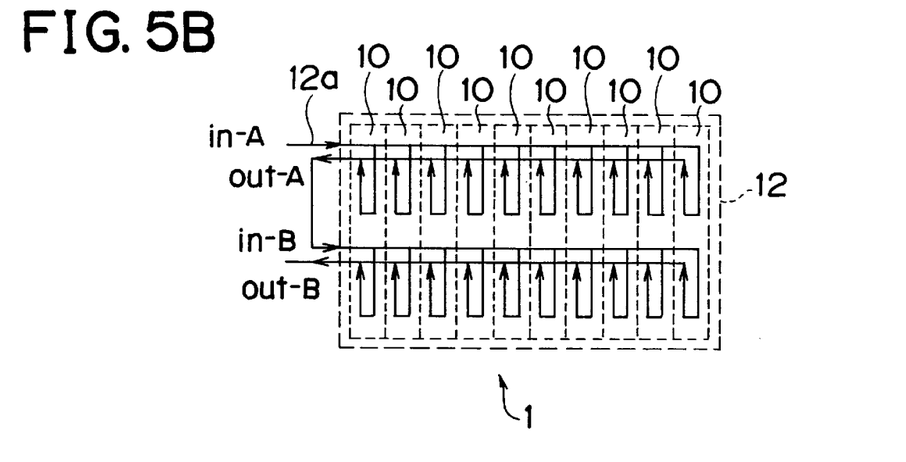
FIGS. 5B and 5C are schematic illustrations of passages in the stack in accordance with the output of the fuel cell.

FIG. 5B illustrates a passage 12a of the flow of the gas in the stack 12 when the output of the fuel cell 1 is at a low level. The gas is introduced into the stack 12 via the inlet passage in-A. The gas from the inlet passage in-A flows through the outlet passage out-A, the inlet passage in-B and the outlet passage out-B in that order. The gas flows out of the stack 12 via the outlet passage out-B.

That is, the passage 12a is formed so that the gas flows sequentially through the passage 10a and the passage 10b in each cell 10.

Figure 5C:
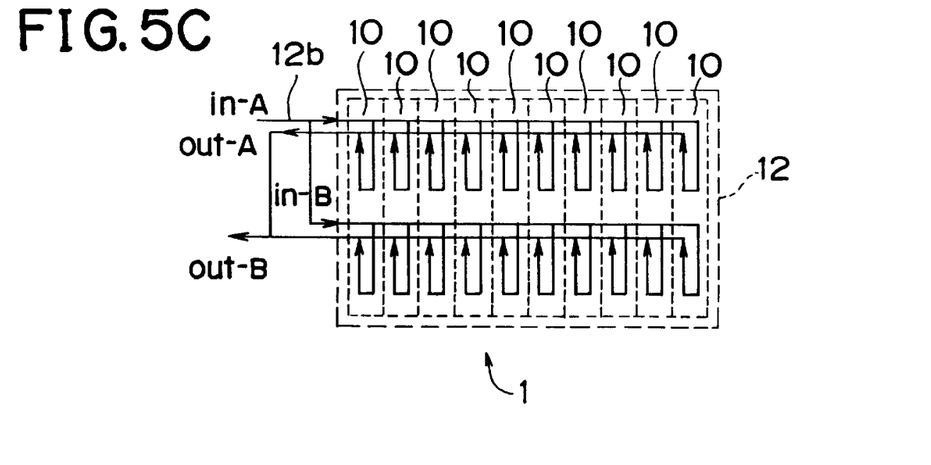

FIG. 5C illustrates a passage 12b of the flow of the gas in the stack 12 when the output of the fuel cell 1 is at a high level. The gas is introduced into the stack 12 via the inlet passages in-A and in-B. The flow of the gas introduced via the inlet in-A is let out of the stack 12 via the outlet passage out-A. The flow of the gas introduced via the inlet passage in-B is let out of the stack 12 via the outlet passage out-B.

That is, the passage 12b is formed so that the gas flows through the passage 10a and the passage 10b in parallel in each cell 10.

A fuel cell 2 according to a second embodiment of the invention will now be described with reference to FIGS. 6A through 6C and 7. The fuel cell 2 has a stack 22 formed by stacking a plurality of unit cells (hereinafter, referred to as "cells") 20.

Figure 6A:
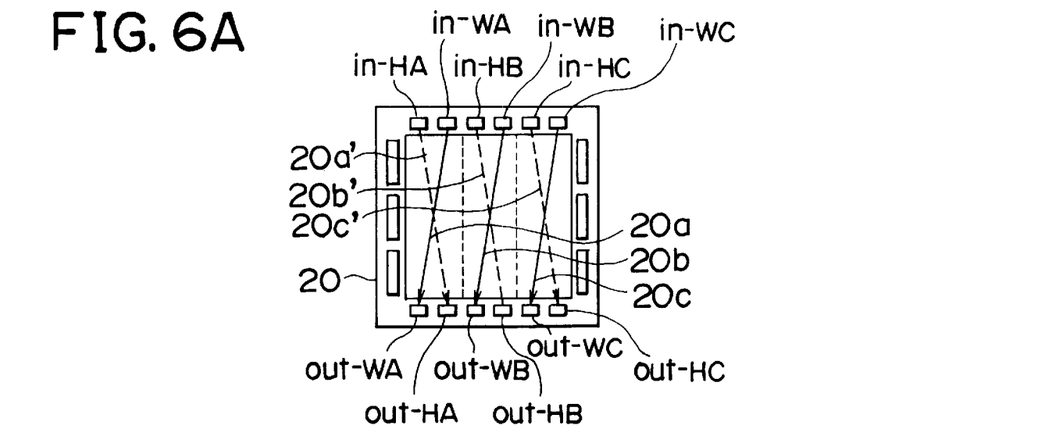
FIG. 6A illustrates a construction of each cell of a fuel cell according to a second embodiment of the invention.

FIG. 6A illustrates a construction of each cell 20 forming the stack 22 of the fuel cell 2.

All the cells of the stack 22 have the same construction.

In this embodiment, a cooling water passage is divided into three passages 20a, 20b, 20c in each cell 20. The passages 20a, 20b, 20c have inlets that are open to inlet passages in-WA, in-WB, in-WC, respectively, and outlets that are open to outlet passages out-WA, out-WB, out-WC, respectively. The passage 10a–10d are separated from one another, and designed so as to convey cooling water.

A passage for a hydrogen-containing reaction gas is also divided into three passages 20a', 20b', 20c' in each cell 20. In FIG. 6A, the passages 20c'–20c' are indicated by broken lines. The passages 20a', 20b', 20c' have inlets that are open to inlet passages in-HA, in-HB, in-HC, respectively, and outlets that are open to outlet passages out-HA, out-HB, out-HC, respectively.

As indicated in FIG. 6A, the passages in each cell 20 are formed so that the passages 20a, 20b, 20c intersect the passages 20a', 20b', 20c', respectively.

Figure 6B:
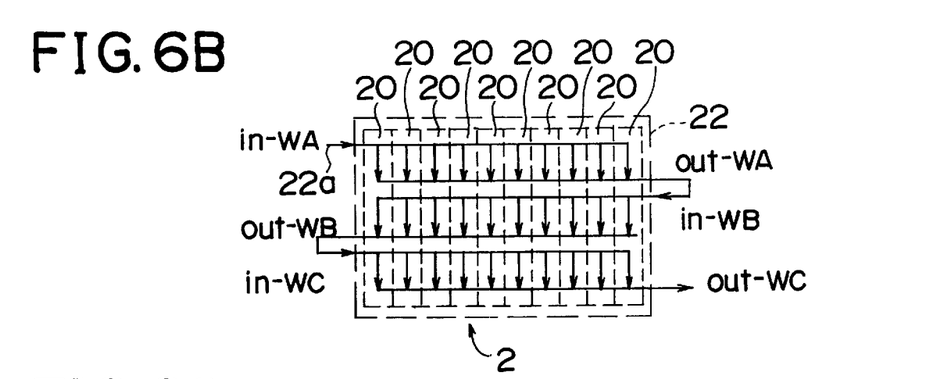
FIGS. 6B and 6C are schematic illustrations of passages in the stack in accordance with the output of the fuel cell.

FIG. 6B illustrates a passage 22a of the flow of cooling water in the stack 22 when the output of the fuel cell 2 is at a high level. In this embodiment, the stack 22 has ten cells 20.

Cooling water is introduced into the stack 22 via the inlet passage in-WA. Following the passage 22a, cooling water flows out of the stack 22 via the outlet passage out-WC.

More specifically, after being introduced from the inlet passage in-WA into the ten cells 20 in parallel, cooling water flows out of the cells 20 into the outlet passage out-WA. Cooling water is then introduced from the outlet passage out-WA into the inlet passage in-WB. Subsequently, cooling water flows from the inlet passage in-WB into the cells 10 in parallel, and flows out into the outlet passage out-WB. Cooling water is then introduced into the inlet passage in-WC. Likewise, cooling water flows from the inlet passage in-WC into the cells 10 in parallel, and flows out into the outlet passage out-WC. Cooling water flows out from the stack 12 via the outlet passage out-WC.

That is, the passage 22a is formed so that cooling water flows sequentially through the passages 20a, the passage 20b and the passage 20c in that order in each cell 20.

Figure 6C:
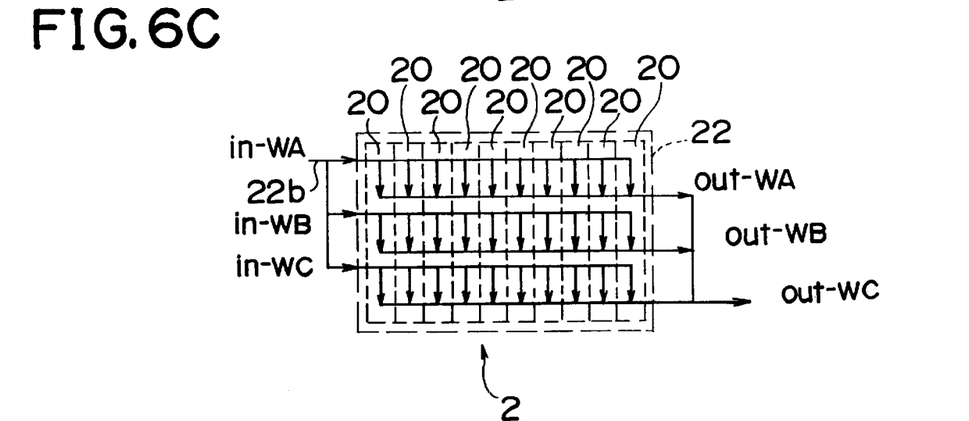

FIG. 6C illustrates a passage 22b of the flow of cooling water in the stack 22 when the output of the fuel cell 2 is at a low level.

As indicated in FIG. 6C, cooling water is introduced into the stack 22 via the inlet passages in-WA, in-WB, in-WC in parallel. Following the passage 22b, cooling water flows out from the stack 22 via the outlet passages out-WA, out-WB, out-WC in parallel.

That is, the passage 22b is formed so that cooling water flows into each cell 20 via the cooling passages in-WA, in-WB, in-WC in parallel, and flows out via the outlet passages out-WA, out-WB, out-WC in parallel.

Thus, the stack 22 is provided with the two passages 22a, 22b, via each of which cooling water flows through the cells 20. One of the two passages 22a–22c is selected by changing the connection of a plurality of passages in the stack 22 in accordance with the operating condition of the fuel cell 2. Therefore, the flow velocity distribution in the stack 22 and the cooling water passage sequence or order can be changed in accordance with the operating condition of the fuel cell 2, so that an optimal cell performance of the fuel cell 2 can be achieved.

In this embodiment, the flow rate of cooling water supplied to the fuel cell 2 remains constant regardless of the output level of the fuel cell 2. The passage connection in the stack 22 is changed so that the flow velocity increases in the passages in the stack 22 to cause turbulence as the output level of the fuel cell 2 becomes higher. Since turbulence of cooling water accelerates heat conduction by cooling water, the cooling performance is enhanced when the fuel cell 2 produces relatively great amounts of heat. The passage connection is changed so that the flow velocity decreases as the output level of the fuel cell 2 becomes lower. Therefore, the pressure loss in the passage decreases, so that the system efficiency improves.

The inlets in-WA, in-WB in-WC and outlets out-WA, in-WB out-WC of the cooling water passages 20a, 20b 20c and the inlets in-HA, in-HB in-HC and outlets out-HA, out-HB, out-HC of the passages 20a', 20b', 20c' for the hydrogen-containing reaction gas are formed near two opposite sides of the four sides of each cell 20 as shown in FIG. 6A. Inlets in-AA, in-AB, in-AC and outlets out-AA, out-AB, out-AC of air passages 20a", 20b", 20c" may be formed near the other two sides.

Figure 7:
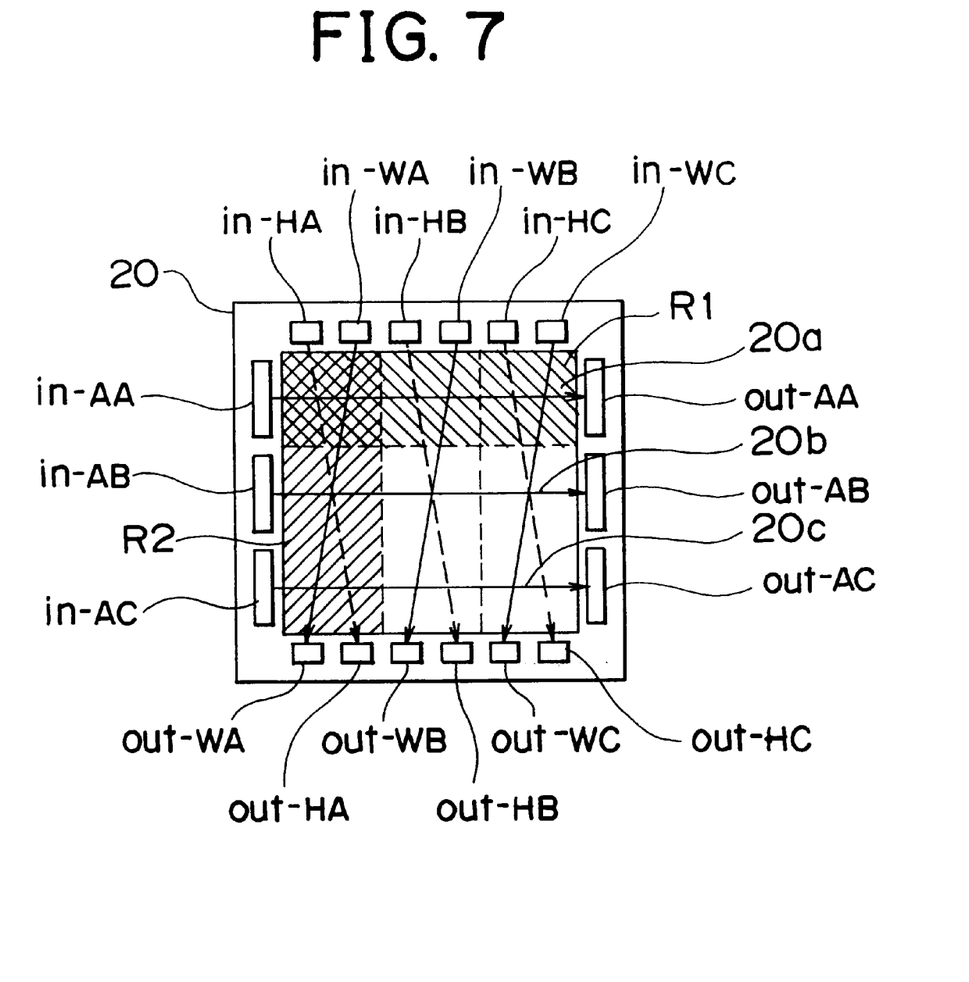
FIG. 7 illustrates the changing of the connection of the passages in a cell in accordance with the operating condition of the fuel cell.

FIG. 7 illustrates a construction of a cell 20 in which the air passages 20a"–20c" are formed in addition to the cooling water passages 20a–20c and the hydrogen-containing reaction gas passages 20c'–20c'.

The connection of the passages formed in the stack 22 for cooling water, the hydrogen-containing reaction gas and air is changed in accordance with the operating condition of the fuel cell 2 as described above. It is preferable to synchronously change the connection of the passages for at least two of the three fluids.

For example, the connection of the passages for cooling water and air in each cell 20 is changed as described below.

When the output of the fuel cell 2 is at a low level, the passages are connected so that cooling water flows through the passages 20a, 20b and 20c (that is, in-WA to out-WA, in-WB to out-WB, and in-WC to out-WC) in parallel, and air flows sequentially through the passages 20a", 20b" and 20c" in that order (that is, in the order of in-AA, out-AA, in-AB, out-AB, in-AC and out-AC).

When the output of the fuel cell 2 is at a high level, the passages are connected so that cooling water flows sequentially through the passages 20a, 20b and 20c in that order (that is, in the order of in-WA, out-WA, in-WB, out-WB, in-WC and out-WC), and air flows through the passages 20a", 20b" and 20c" (that is, in-AA to out-AA, in-AB to out-AB, and in-AC to out-AC) in parallel.

Each cell 20 produces a maximum amount of heat near an air inlet location where air is introduced. Therefore, when the output of the fuel cell 2 is at the low level (that is, when air is conveyed sequentially through the passages 20a"–20c"), a relatively great amount of heat is produced in a region R1 extending from the inlet in-AA to the outlet out-AA. When the output of the fuel cell 2 is at the high level (that is, when air is conveyed through the passages 20a"–20c" in parallel), a relatively great amount of heat is produced in a region R2 extending near the inlets in-AA, in-AB and in-AC. In FIG. 7, the region R1 is indicated by a hatching from upper left to lower right, and the region R2 is indicated by a hatching from upper right to lower left.

Synchronously with the changing of the connection of the air passages, the connection of the cooling water passages is changed. That is, when the output of the fuel cell 2 is at the low level, the cooling water passages are connected so that cooling water is introduced into each cell 20 via a location near the region R1. When the output of the fuel cell 2 is at the high level, the cooling water passages are connected so that cooling water is introduced into each cell 20 via a location near the region R2. Thus, the cooling water passages are connected so that cooling water is always introduced into each cell 20 via a location where a relatively great amount of heat is produced, whether the output level of the fuel cell 2 is high or low. Therefore, a substantially uniform temperature distribution can be maintained in each cell 20. That is, the cooling of each cell 20 can be performed in accordance with the gas flow rate.

A fuel cell 3 according to a third embodiment of the invention will now be described with reference to FIGS. 8A through 9D. The fuel cell 3 includes a stack 32 formed by stacking a plurality of unit cells (hereinafter, referred to as "cells") 30. The cells 30 are divided into at least two groups.

For the description below, let it assumed that the stack 32 has fourteen cells 30 that are divided into a first group of seven upstream-side cells 30-1 and a second group of seven downstream-side cells 30-2. This assumption does not restrict the number of cells 30 provided in the stack 32 or the manner of dividing the cells 30 into groups. The stack 32 may have an arbitrary number of cells 30, and the cells 30 may be divided into an arbitrary number of groups in an arbitrary manner.

Figure 8A:
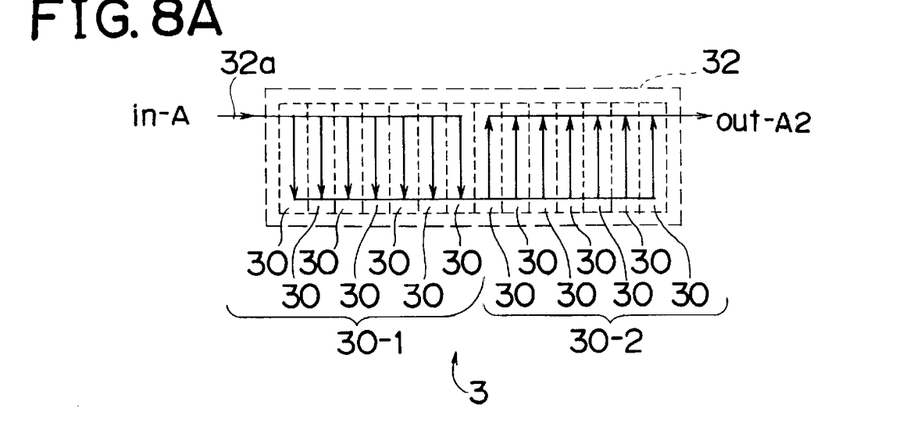
FIGS. 8A and 8B are schematic illustrations of passages in the stack in accordance with the output of a fuel cell according to a third embodiment of the invention.

FIG. 8A illustrates a passage 32a of the flow of the gas in the stack 32 when the output of the fuel cell 3 is at a low level. The gas is introduced into the stack 32 via an inlet passage in-A, and led into the seven cells 30-1 in parallel. Subsequently, the gas is led into the seven cells 30-2. After that, the gas flows out of the stack 32 via an outlet passage out-A2.

Figure 8B:
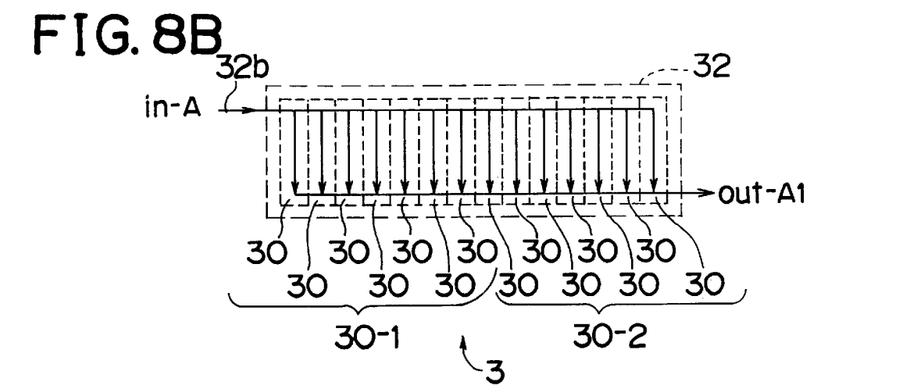

FIG. 8B illustrates a passage 32b of the flow of the gas in the stack 32 when the output of the fuel cell 3 is at a high level. The gas is introduced into the stack 32 via an inlet passage in-A, and led into the seven cells 30-1 and the seven cells 30-2 in parallel. After that, the gas flows out of the stack 32 via an outlet passage out-A1.

The changing between the passages 32a and 32b in the stack 32 is performed by, for example, controlling the open and closed states of a plurality of control valves.

Figure 8C:
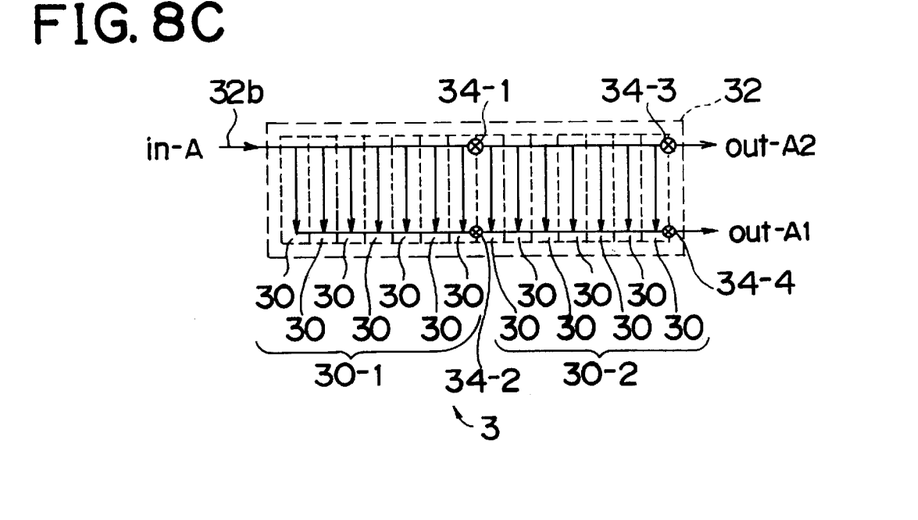
FIG. 8C illustrates an arrangement of control valves disposed for changing between the passages formed in the stack.

FIG. 8C illustrates an arrangement of control valves 34-1 through 34-4. The passage 32a indicated in FIG. 8A can be formed in the stack 32 by setting the control valves 34-1, 34-4 to the closed state and setting the control valves 34-2, 34-3 to the open state. The passage 32b indicated in FIG. 8B can be formed in the stack 32 by setting the control valves 34-1, 32-2, 34-4 to the open state and setting the control valve 34-3 to the closed state.

Thus, the stack 32 is provided with the two passages 32a, 32b, via each of which the gas flows through the cells 30. One of the two passages 32a–32c is selected by changing the connection of a plurality of passages in the stack 32 in accordance with the operating condition of the fuel cell 3. Therefore, the flow velocity distribution in the stack 32 and the gas passage sequence can be changed in accordance with the operating condition of the fuel cell 3, so that an optimal performance of the fuel cell 3 can be achieved.

Preferably, the connection of the plurality of passages in the stack 32 is changed so that the passage sectional area in the stack 32 increases as the output level of the fuel cell 3 becomes higher (that is, as the gas flow rate in the stack 32 becomes higher). This means that the connection of the passages should preferably be changed so that the passage resistance decreases as the output level of the fuel cell 3 becomes higher. By changing the passage connection in this manner, the pressure loss can be reduced, so that the system efficiency improves. Furthermore, since the gas flow velocity is allowed to be optimized in accordance with the output level of the fuel cell 3, the output of the fuel cell 3 becomes stable over a wide output range.

It is preferable that a dry-type electrolyte membrane that needs no (or little) moisturizing be formed on a surface of each cell 30 where the passages 10a–10d are formed. Such a dry-type electrolyte membrane may be, for example, a fluorine-based membrane. However, if a fluorine-based membrane is formed in each the cells 30 of the stack 32, the cost of the stack 32 may become undesirably high.

Therefore, it is preferred to form a fluorine-based membrane in the cells 30-1 located at an upstream side in the gas passage in the stack 32 and form a hydrocarbon-based membrane in the cells 30-2 located at a downstream side in the stack 32. This design reduces the cost of the stack 32 since hydrocarbon-based membranes normally cost less than fluorine-based membranes. Whereas the first embodiment uses a plurality of electrolyte membranes for each cell, the third embodiment uses only one electrolyte membrane for each cell, thereby facilitating formation of sealing and the like in each cell and achieving an improvement in efficiency.

Hydrocarbon-based membranes are wet-type electrolyte membranes. Therefore, if a dry cathode operation, that is, an operation without moisturizing the cathodes, is performed where a hydrocarbon-based membrane is used, there normally is a danger that the operation becomes impossible due to moisture shortage. However, in the case where the hydrocarbon-based membrane is used only for a downstream region in the gas passage in the stack 32, moisture shortage that prevents the cell operation does not occur because water or moisture is supplied to the downstream region by the chemical reaction on the cathodes.

Through a combined use of a fluorine-based membrane, that is, a dry-type electrolyte membrane, and a hydrocarbon-based membrane, that is, a wet-type electrolyte membrane, it becomes possible to reduce the cost of the stack 32 without incurring the danger of operation failure due to moisture shortage.

It is not necessary that all the cells 30 of the stack 32 have the same construction. For example, the upstream-side cells 30-1 and the downstream-side cells 30-2 may differ in the number of passages divided in each cell.

If the number of passages divided in a cell increases toward a downstream end of the stack 32, a high flow velocity and a high stirring property can be attained in a downstream-side region in the stack 32. Therefore, substantially uniform cell performance in the entire stack 32 can be achieved.

Figure 9A:
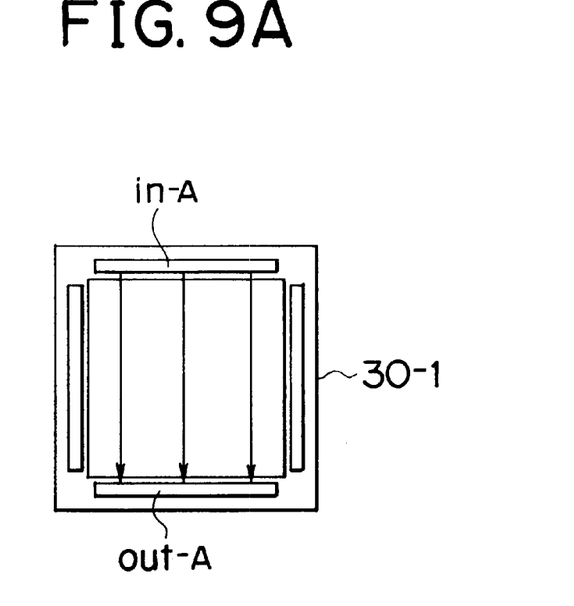
FIG. 9A illustrates a construction of a cell disposed in an upstream-side region in the stack.

FIG. 9A illustrates a cell 30-1 disposed in an upstream-side region in the stack 32. As indicated in FIG. 9A, the gas flows through the cell 30-1 from the inlet in-a to the outlet out-A, and flows out of the cell 30-1 via the outlet out-A. The number of passages divided in the cell 30-1 shown in FIG. 9A is one.

Figure 9B:
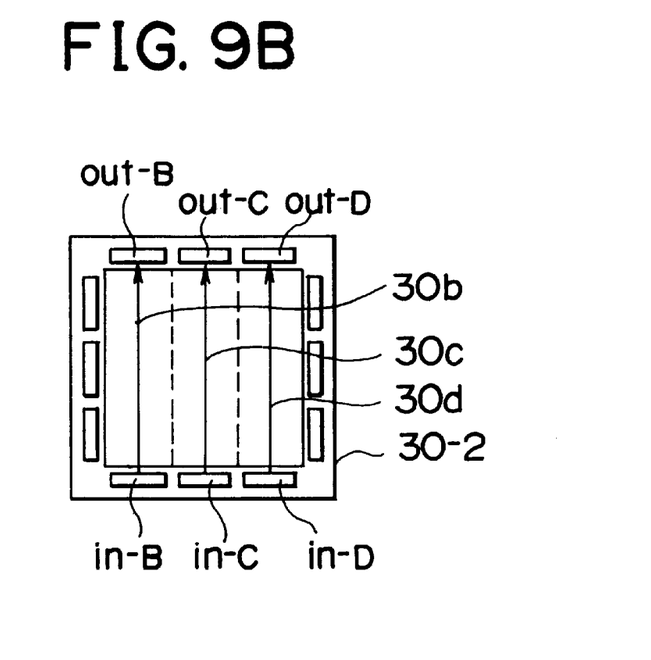
FIG. 9B illustrates a construction of a cell disposed in a downstream-side region in the stack.

FIG. 9B illustrates a cell 30-2 disposed in a downstream-side region in the stack 32. The cell 30-2 has three passages 30b–30d having inlets in-B, in-C, in-D and outlets out-B, out-C, out-D, respectively. Each of the passages 30b–30d is formed so as to guide a gas (for example, a fuel gas, that is, a reaction gas containing hydrogen). The number of passages divided in the cell 30-2 shown in FIG. 9B is three.

The cells 30-1, 30-2 may be designed so that the number of passages divided in each cell is variable in accordance with the operating condition of the fuel cell 3. For example, the cells 30-1, 30-2 may have the same construction as the cells 10 of the first embodiment.

In this construction, too, different types of electrolyte membranes may be used in the cells 30-1 and the cells 30-2, as described above with reference to FIGS. 8A and 8B.

Figure 9C:
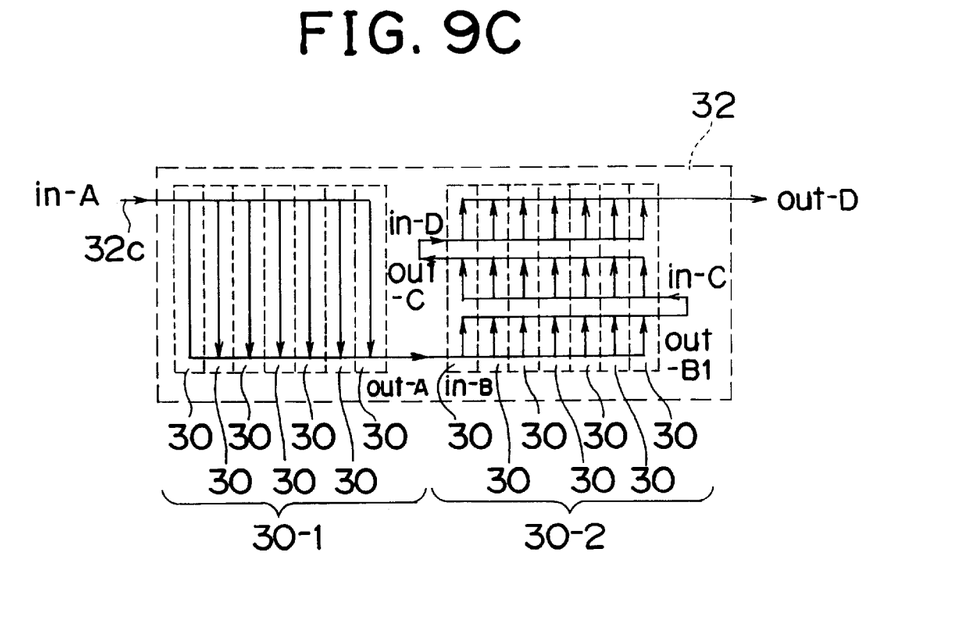
FIG. 9C is a schematic illustration of a gas passage in the stack.

FIG. 9C illustrates a passage 32c of the flow of the gas in the stack 32 formed by the cells 30-1, 30-2. The gas passage 32c is formed so that the number of passages divided in a cell differs between an upstream-side region and a downstream-side region in the stack 32. After being introduced into the stack 32 via the inlet passage in-A, the gas is led into the seven cells 30-1 in parallel. Subsequently, the gas is led into the seven cells 30-2 in parallel. In each cell 30-2, the gas flows in the sequence of in-B, out-B1, in-C, out-C, in-D and out-D.

The changing between the passages in stack 32 is performed by, for example, controlling the open and closed states of a plurality of control valves.

Each cell 30-2 may also have the construction as illustrated in FIG. 3.

Figure 9D:
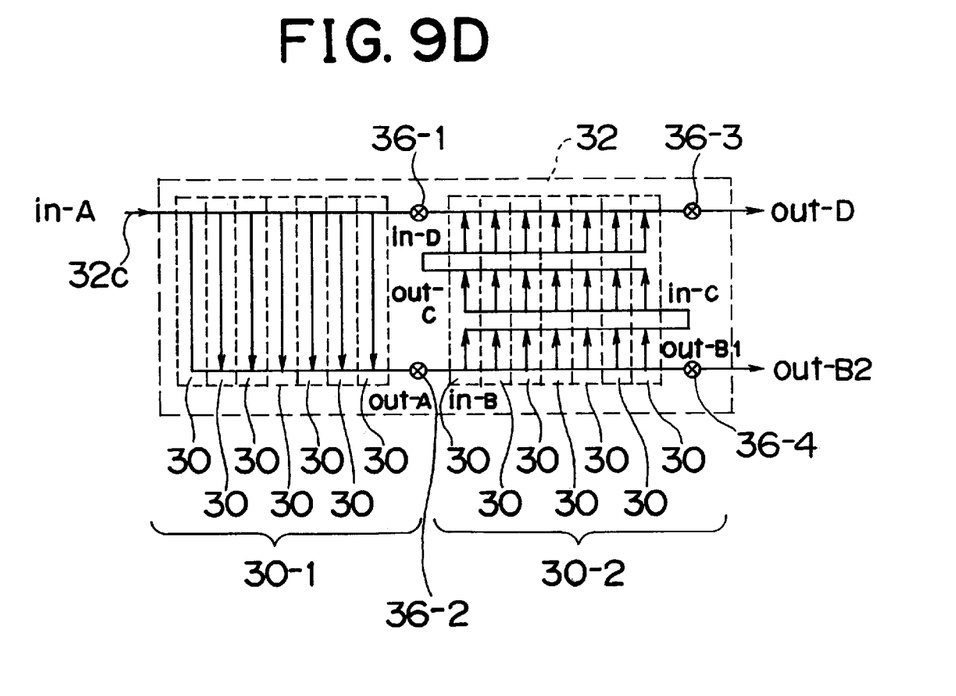
FIG. 9D illustrates an arrangement of control valves disposed for changing between the passages formed in the stack.

FIG. 9D illustrates an arrangement of control valves 36-1 through 36-4 disposed for changing between the passages in the stack 32. The passage 32c indicated in FIG. 9C can be formed in the stack 32 by setting the control valves 36-1, 36-4 to the closed state and setting the control valves 36-2, 36-3 to the open state. In the thus-selected passage, the gas is let out of the stack 32 via the outlet passage out-D. A passage different from the passage 32C can be formed in the stack 32 by controlling the states of the control valves 36-1 through 36-4. For example, by setting the control valves 36-1 and 36-4 to the open state and setting the control valves 36-2 and 36-3 to the closed state, the direction of the gas flow in the cells 30-2 is reversed from the direction indicated in FIG. 9C. In the thus-selected passage, the gas is let out of the stack 32 via the outlet passage out-B2.

Although in the first to third embodiments, the fluid passage sequence in the stack is changed by changing the connection of the passages formed in the stack, it is also possible to change the direction of the fluid flowing in the stack by changing the connection of the passages formed in the stack. For example, the passage connection may be changed so as to reverse the direction of the fluid flowing in the entire stack.

It is also possible to change the fluid passage sequence in each cell of the stack or in one or more cells of the stack by changing the connection of the passages formed in the stack.

In the fuel cell of the invention, a plurality of passages are provided for a fluid that flows in a stack having a plurality of cells, and the connection of the passages is changed in accordance with the operating condition of the fuel cell. Therefore, the flow velocity distribution in the stack and the fluid passage sequence can be changed in accordance with the operating condition of the fuel cell. As a result, an optimal performance of the fuel cell can be achieved.

It is also possible to change the connection of passages so that the passage resistance changes in accordance with the operating condition of the fuel cell. As a result, the flow velocity in accordance with the operating condition of the fuel cell can be attained, so that an optimal performance of the fuel cell can be achieved.

If the fluid flowing in the stack is a reaction gas, it is preferable to change the connection of the passages so that the passage resistance decreases as the output of the fuel cell increases. As a result, a gas flow rate required for high output operation can reliably be achieved, so that favorable progress of the reactions can be maintained in the fuel cell.

If the fluid flowing in the stack is cooling water, it is preferable to change the connection of the passages so that the flow velocity increases as the output of the fuel cell increases. An increased flow velocity causes turbulence of cooling water, so that the cooling performance during high output operation can be enhanced.

If a plurality of first passages for a first fluid that flows in the stack are formed in the stack and a plurality of second passages for a second fluid that flows in the stack are formed in the stack, it is preferable to change the connection of the second passages synchronously with the timing of changing the connection of the first passages, that is, to synchronously change the connection of the first passages and the connection of the second passages. For example, if the connection of a plurality of cooling water passages is changed synchronously with the changing of the connection of a plurality of gas passages, the cooling in accordance with the gas flow rate can be performed.

It is also preferable that an upstream-side portion of a passage in the stack be formed on a dry-type electrolyte membrane and a downstream-side portion of the passage be formed on a wet-type electrolyte membrane. As a result, the reactions in the fuel cell are optimized.

If a plurality of unit cells are divided into a first group and a second group, the number of passages divided in each cell of the first group may be different from the number of passages divided in each cell of the second group. This construction increases the variations of passages and therefore increases the freedom in design and the like, in comparison with a construction in which all the unit cells of a stack have the same number of divided passages.

If a passage in the stack is divided into a plurality of passages in a unit cell, the inlets and outlets of the passages may be arranged near a predetermined side of the cell. This arrangement makes it possible to reduce dead spaces related to portions required for gas manifolds or sealing. Therefore, the output density per unit volume of the fuel cell can be increased.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements included within the spirit and scope of the invention.

What is claimed is:

1. A fuel cell comprising:
   a stack including a plurality of cells;
   a plurality of first passages for a first fluid that flows in the stack; and
   a fluid passage formed by connecting each of the plurality of first passages and a passage changer which changes a connection state of each of the first passages so that the fluid passage changes,
   wherein the passage changer changes the connection state of the plurality of first passages in accordance with an operating condition of the fuel cell so that a magnitude of a passage resistance of the fluid passage changes to alter the flow of the first fluid within the stack.

2. A fuel cell according to claim 1, wherein the first fluid is a reaction gas, and wherein the passage changer changes the connection state of the first passages so that the passage resistance decreases, thereby permitting increased reaction gas flow and increased output of the fuel cell.

3. A fuel cell according to claim 1, wherein the first fluid is a coolant, and wherein the passage changer changes the connection state of the first passages so that the passage resistance increases as an output of the fuel cell increases.

4. A fuel cell according to claim 1, further comprising:
a plurality of second passages for a second fluid that flows in the stack,
the passage changer changing a connection state of the second passages synchronously with a timing of the changing of the connection state of the first passages.

5. A fuel cell according to claim 1, wherein upstream-side portions of each of the first passages located at inlet sides thereof are formed on a dry-type electrolyte membrane, and downstream-side portions of the first passages located at outlet sides thereof are formed on a wet-type electrolyte membrane.

6. A fuel cell according to claim 5, wherein the dry-type electrolyte membrane is a fluorine-based membrane, and the wet-type electrolyte membrane is a hydrocarbon-based membrane.

7. A fuel cell according to claim 1, wherein at least one of the first passages is divided into a plurality of divided passages in at least one of the cells, and wherein at least two cells differ from each other in the number of passages for the first fluid extending therethrough.

8. A fuel cell according to claim 1, wherein at least one of the first passages is divided into a plurality of divided passages in at least one of the cells, and wherein inlets and outlets of the first passages of at least one cell are formed adjacent to a side of the at least one cell.

* * * * *